Nov. 16, 1965    J. B. MEISTER    3,218,486
TRANSFER PROCESS CONTROL CIRCUIT
Filed Sept. 5, 1962    2 Sheets-Sheet 1

JACK B. MEISTER
INVENTOR.

BY Sal A. Giarratana attorney

JACK B. MEISTER
INVENTOR.

United States Patent Office

3,218,486
Patented Nov. 16, 1965

3,218,486
TRANSFER PROCESS CONTROL CIRCUIT
Jack B. Meister, Morristown, N.J., assignor to Integrated Electronics Corporation, Wharton, N.J., a corporation of New Jersey
Filed Sept. 5, 1962, Ser. No. 221,487
5 Claims. (Cl. 307—149)

This invention relates to switching circuits and more particularly to protective control circuits of repetitive transfer processes wherein undesired variations in the cycle are sensed, automatically causing the cessation of motion of the process.

A repetitive transfer process can be defined as a repetitive act or function wherein similar or identical pieces, each to be worked upon in a similar manner, are transferred into their proper position relative to the item or items by which the work is to be done, each piece being so worked upon in turn, one after the other, in repetitious steps or motions of the working items. It also includes the act or function of moving a continuous process past or through a working member wherein work, in repetitious steps, is performed upon the entire length of the continuous process. Typical of the above are the functions of feeding material to automatic transfer presses, automatic punch presses, screw machines, blow moulding machines and of conveyors. In all such processes it is imperative that each subsequent piece or portion to be worked upon move in identical steps or identical manner with its previous counterpart. Unless this occurs, the working members or the worked members will be damaged. For example, in an automatic transfer press, if a work piece fails to move properly into position from one station to the next, it will be improperly formed at that next station and will probably cause the press punch and/ or die to be damaged. Worse still, it may cause subsequent pieces to move improperly, causing a complete breakdown of the working process. All are undesirable and (all further) necessitate shutdown and downtime of the machine to rectify. Methods have long been sought to insure that variations in the transfer process be discovered and that the working members be stopped before contact with the out of place work piece be made.

Human supervision is impractical in most instances because of the expense involved but more so, because in most high speed automatic machinery, the human reaction time is too great to allow for a proper shundown of the machine after a variation has been sensed. Consequently, automatic control devices have been devised.

Basically, present devices consist of electrical circuits of one form or other, incorporating fingers or feelers which make contact with each work piece as it passes the finger. If a work piece does not make contact with a feeler, the circuit then causes a cutoff of power to the machine. In some circuits, the start of a cycle is timed with the start of the charging of a capacitor, the rate of such charging being fixed. The feelers are all connected electrically to the capacitor and each must sense or touch its respective work piece to limit the charge build up. If a finger does not make contact with a work piece, the charge on the capacitor builds up to the point where it actuates a stop relay, cutting power to the machine. In such circuits, however, aging or failure of electrical components result in variations in the charging rate causing the machine to shut off even when there is no breakdown in the motion cycle or, worse still, causing a slow down of the shut off to the point where the working member has gone too far in its cycle before the machine is stopped. As previously indicated, this is undesirable.

In other circuits, wherein transistors are used, the circuits are so sensitive that the fingers or feelers can be shorted through oil films and other conductive wastes that inevitably accumulate on machines in which the circuits are used, causing the circuit to react as if a work piece had made contact with its feeler when, in fact, it may not have done so.

The general purpose of this invention is to provide a circuit which is capable of sensing undesirable variation in the transfer cycle and, when sensed, to cause motion to cease at a predetermined adjustable point in the cycle prior to any damage to any work piece or working item, th circuit being positive in that its use will not result in the slow degradation of its performance, the circuit further being sensitive only to the movement of the transferred material or pieces and, further still automatically indicating the work piece which has failed to transfer properly.

It is therefore an object of this invention to provide a control circuit whose performance does not degrade with use.

Another object is to provide a control circuit wherein the point of shutdown of the machine cycle is a predetermined point in the cycle which is the same for a shutdown due to any variation in the transfer movement or of the malfunction of any other process of the controlled machine which is being monitored by said control circuit.

A further object of this invention is the provision of a control circuit wherein the point of shutdown of the machine cycle is adjustable.

A still further object of this invention is the provision of a control circuit wherein the work piece which has failed to transfer properly is automatically indicated.

Yet another object of this invention is the provision of a control circuit of a transfer process which can readily incorporate in the same circuit, when desired, shutdown of the machine for occurrences other than the undesirable variations in the transfer cycle, such as run out of stock, full collector bins, stock buckling, improper stock thickness, and the like.

Other objects and many of the attendant advantages of this invention will be readily appreciated as the same become better understood by reference to the following detailed description when considered in connection with the accompanying drawings in which like reference numerals designate like parts throughout the figures thereof and wherein.

Figure 1:
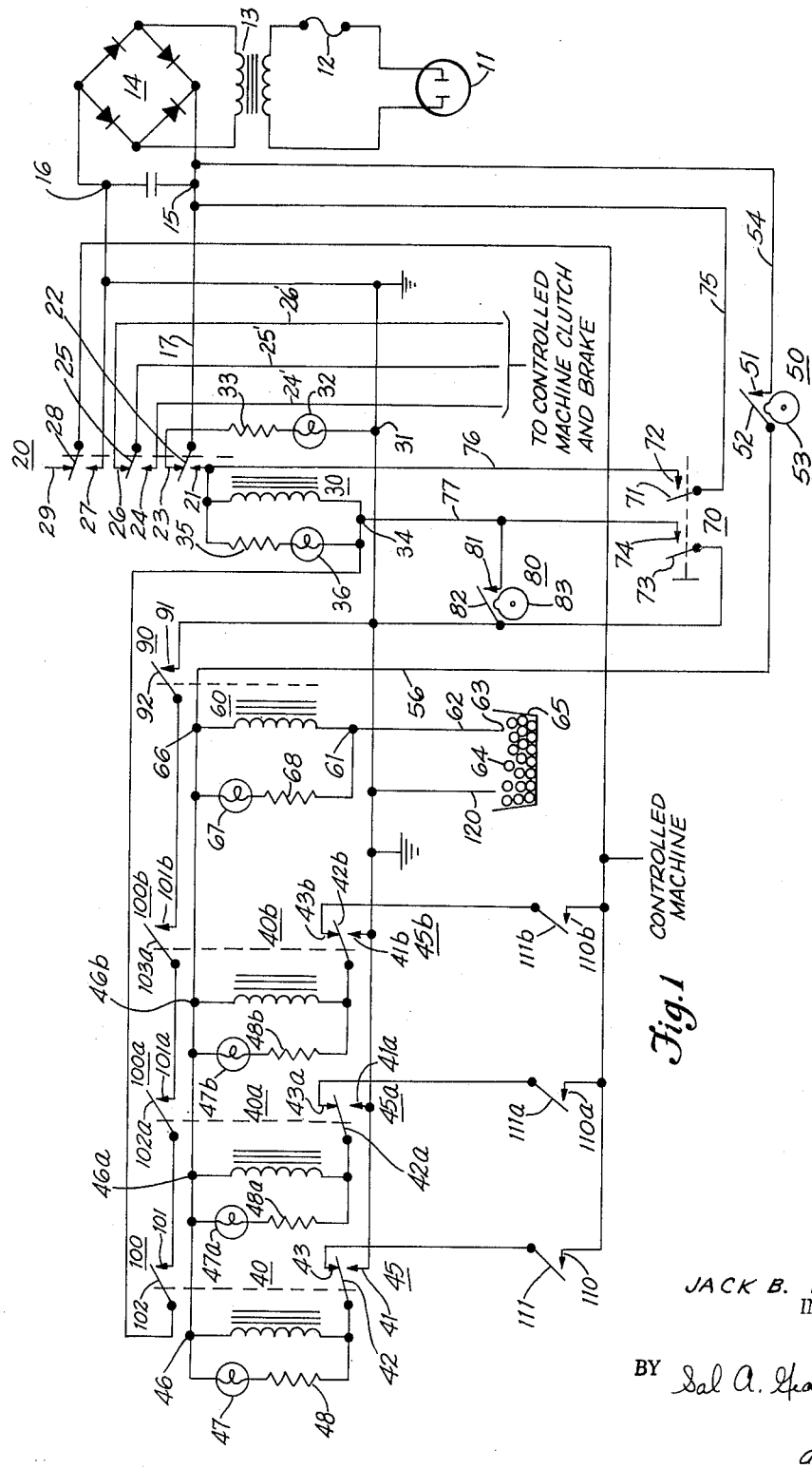
FIGURE 1 is a schematic drawing of a preferred embodiment of the invention.

Referring now to FIGURE 1, the preferred embodiment 10 shown is a schematic of the use of this invention in controlling the operation of a transfer press, not shown. Power is derived from an ordinary A.C. outlet thru electrical plug 11. Fuse 12 is provided to protect the unit in the event of overload. The current is then supplied to the primary of step down transformer 13, the output of the secondary of which is rectified in rectifier 14 to give D.C. voltage, the positive pole of which is connection 15 and the ground of which is 16. Ground connection 16 is connected electrically to contact 27 of switch 20, which switch is operated by relay 30. Ground 16 is further electrically connected to some conducting object which acts as absolute ground, from which the controlled machine, in this instance the transfer press, is electrically insulated. Ground 16 is further electrically connected to the ground end 31 of stop lamp 32, whose positive end is connected thru limiting resistor 33 to contact 23 of switch 20. Ground 16 is also electrically connected to contacts 41, 41A and 41B of switches 45, 45A and 45B respectively, which switches are in turn operated by relays 40, 40A and 40B respectively. It is to be noted that ground 16 and all its connections are electrically distinct and insulated from the controlled machine.

Positive pole 15 is connected through wire 54 to contact 51 of normally closed cam switch 50, which switch is physically located on the controlled machine and is operated by cam 53. Cam 53 is attached or geared directly to the main power shaft of the controlled machine such that it makes one revolution per machine cycle or transfer. Switch 50 is an instantaneous break switch, i.e., it is always closed unless being forced open by cam 53. Pole 52 of switch 50 is connected through wire 56 to the positive poles 46, 46A and 46B of relays 40, 40A and 40B rsepectively as well as to positive pole 66 of relay 60. Indicating lamps 47, 47A, 47B and 67 are connected in parallel, through limiting resistors 48, 48A, 48B and 68 respectively, with relays 40, 40A, 40B and 60.

Positive pole 15 is further connected by wire 17 to pole 22 on switch 20 and by wire 75 to pole 71 of reset switch 70 which switch is a double pole instantaneous contact switch, manually operated. Contact 72 of switch 70 is connected by wire 76 to pole 21 of switch 20. Contact 74 of switch 70 is connected through wire 77 to the ground end 34 of relay 30 and also to contact 81 of cam switch 80. Pole 73 of reset switch 70 is electrically connected to ground 16, as is pole 82 of cam switch 80. Cam switch 80, like cam switch 50, is a normally closed instantaneously opened switch which opens only when being forced by cam 83 and cam 83, like cam 53, is physically attached or geared directly to the main power shaft of the controlled machine such that it also makes one revolution per machine cycle or transfer.

Also connected electrically to ground 16 is contact 91 of switch 90, which latter switch is connected in series with switches 100, 100A and 100B to ground end 34 of relay 30. Switch 90 is a normally closed switch, opening only when relay 60 is activated. Switches 100, 100A and 100B are normally opened switch, closing only when relays 40, 40A and 40B respectively are activated.

The remaining contacts and poles of switch 20 are contact 29, an open contact; pole 28, which is connected electrically directly to the controlled machine; contact 26, pole 25 and contact 24 which are connected to the controlled machine clutch and brake through wires 26′, 25′ and 24′ respectively such that when pole 25 is in contact with contact 26, the clutch between the main power shaft of the controlled machine and the machine motion source is open and the main power shaft of the controlled machine is braked; and when pole 25 is in contact with contact 24, the reverse is true, i.e., the controlled machine main power shaft is connected to its source of motion and is not braked in any manner. As shown, switch 20 is in its open position, in which position it normally remains except when relay 30 is activated, during which time poles 28, 25 and 22 reverse and make contact with contacts 27, 24 and 21 respectively. Lamp 36 is connected in parallel with relay 30 through limiting resistor 35.

Figure 2:
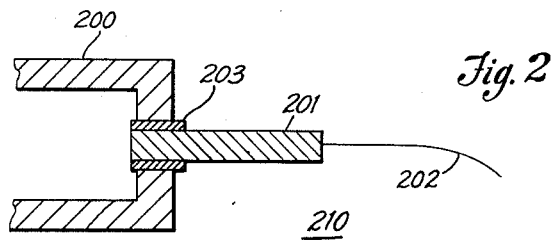
FIGURE 2 is a side elevation of the probes or feelers of the preferred embodiment of the invention, showing the manner of mounting upon the controlled machine.

Switches 45, 45A and 45B are make-before-break switches that are normally in the position shown, i.e., poles 42, 42A and 42B contacting contacts 43, 43A and 43B respectively. When relay 40, 40A or 40B is activated, pole 42, 42A or 42B respectively, first makes contact with contact 41, 41A or 41B respectively, then breaks contact with contact 43, 43A or 43B respectively and remains in that position until relay 40, 40A or 40B respectively is deactivated. Feelers or fingers 111, 111A and 111B are electrically connected to contacts 43, 43A and 43B respectively. A typical feeler or finger 210, as can be seen in FIGURE 2 consists of electrically conductive rod 201 to which is physically and electrically connected exposed wire 202 made of some resilient electrical conductive material such as spring steel, bronze or the like. The rod is physically attached to the controlled machine 200, being electrically insulated therefrom by insulator 203.

Feelers or fingers 111, 111A and 111B are so arranged upon the controlled machine 200 such that the work pieces 110, 110A and 110B will make contact with feelers 111, 111A and 111B as they travel past them in their transfer from one position to the next if the work pieces 110, 110A and 110B are traveling properly. If work piece 110, 110A or 110B is not traveling as it should, it will not make contact with its respective feeler or finger.

Returning to relay 60 as shown in FIGURE 1, its ground end is electrically connected to feeler 62 which is physically fixed with its end 63 suspended in the bin 65 into which the completed work pieces 64 are falling. Also suspended in like fashion but not making contact with feeler 62 is feeler 120 which is connected electrically to ground 16. When the bin 65 becomes full of completed work pieces 64, electrical contact between feeler 62 and 120 is made through completed work pieces 64.

It should be here noted that the work pieces in this preferred embodiment are made of some electricity conducting material and throughout their motion through the controlled machine, are electrically connected to the machine through their holding apparatus. (A) To control a transfer of plastic or other nonconductive workpieces, the sensing fingers can be modified so that they consist of two isolated spring tempered electrically conductive poles, one of which is electrically connected to the controlled machine and the other of which is electrically connected to contact 43, 43A or 43B. Proper transfer of the workpieces, in such an arrangement, would cause the poles to make contact. Thus, the circuit would be exactly as shown in FIGURE 1 and would function in exactly the same manner.

The operation of the preferred embodiment is as follows. The plug 11 is first inserted into an A.C. electrical outlet, thereby providing power to the unit. The producer of the motive power to the main power shaft of the controlled machine is then made to operate. It can be seen that in this posture, the controlled machine is not operative since relay 30 is inoperative and pole 25 of switch 20 is in contact with contact 26 of the same switch. At this time, stop lamp 32 is on since there is a completed circuit from positive pole 15 through wire 17, pole 22 and contact 23 of switch 20, limiting resistor 33, stop lamp 32 to ground 16.

To start the controlled machine and the transfer process, reset switch 70 is manually operated. Instantaneously relay 30 is energized since there is then a completed circuit from positive pole 15 through wire 75, pole 71 and contact 72 of reset switch 70, wire 76, relay 30, wire 77, contact 74 and pole 73 of switch 70 to ground 16. Since go lamp 36 is in parallel with relay 30, it is now lit. With relay 30 activated, pole 25 of switch 20 makes contact with contact 24 and the controlled machine begins its cycle. Pole 22 of switch 21 also breaks with contact 23 and makes contact with contact 21. The first causes, stop lamp 32 to be extinguished by breaking its connection to positive pole 15. The latter causes relay 30 to lock in since, even after the operator releases reset switch 70, relay 30 receives power from positive pole 15 through pole 22 and contact 21 of switch 20 and completes its circuit through normally closed cam switch 80 to ground 16. The operation of relay 30 also causes pole 28 to make contact with contact 27, thereby causing the controlled machine to be electrically connected with ground 16.

The controlled machine thus begins its cycle. As it continues work pieces 110, 110A and 110B make contact with feelers 111, 111A and 111B respectively. As work piece 110 contacts feeler 111, relay 40 is energized since a completed circuit occurs from positive pole 15 through wire 54, normally closed cam switch 50, wire 56, relay 40, pole 42 and contact 43 of switch 45, feeler 111, work piece 110, through the controlled machine to pole 28 of switch 20, through contact 27 to ground 16. When relay 40 is thus energized, switch 100 closes and lamp 47 lights up. Moreover, relay 40 locks in since pole 42 makes contact with contact 41 and then breaks with contact 43, providing for a completed circuit through contact 41 to ground 16 without the need of going through feeler 111 and the work piece 110 as before. Thus when the workpiece 110 passes feeler 111 and contact between the two is broken, relay 40 remains energized. In like manner, relays 40A and 40B lock in and lamps 47A and 47B go on as feelers 111A and 111B make and break contact with workpieces 110A and 110B respectively.

As the controlled machine cycle continues, cam 83 operating on switch 80 causes it to open. If all feelers 111, 111A and 111B have made contact with their respective workpieces, the opening of cam switch 80 has no effect on the cycle, since relay 30, whose energization causes the controlled machine to continue receiving motive power, remains energized by virtue of the ground connection through closed switches 100, 100A, 100B and 90. If, however, any one of the feelers 111, 111A or 111B had failed to make contact with their respective workpiece, the opening of cam switch 80 would have caused relay 30 to be deactivated since it would no longer have a connection to ground. Thus pole 25 of switch 20 would then break with contact 24 and make with contact 26, causing the cycle to cease. Moreover, since the relay 40, 40A or 40B associated with the feeler that had not made contact with its workpiece, would never have been energized it would not then be locked in as above described and consequently, the lamp 47, 47A or 47B in parallel with the un-energized relay would not then be lit, indicating which feeler had not sensed its workpiece, and therefore which workpiece had not properly transferred. After correcting the situation, the operator can simply operate the reset switch and the machine starts up again as described hereinbefore and continues in its cycle.

As it continues, cam 53 operates switch 50 so that it is caused to open. Since wire 56 is then no longer connected to positive pole 15, relays 40, 40A 40B and 60 are all deprived of their positive source of voltage and, consequently, any of them still energized at that time become deenergized. This causes their associated lamps then lit to be extinguished; switches 100, 100A and 100B, if any are closed, to open; and switches 45, 45A and 45B, if any had previously operated, to revert to their same position as when the cycle began, i.e., the same as shown in FIGURE 1. At this point, the controlled machine has gone through a complete cycle. Its operation through the next cycle is identical with its operation during the first cycle as above described.

The controlled machine thus continues in its operation. If no variation in the transfer process occur, the machine repeats its cycle over and over again. When a variation in the transfer process does occur, the machine is automatically stopped when cam 83 actuates cam switch 80. It is at this point in the cycle, and at this point only, where the machine is stopped because it is only at this point in the cycle where relay 30 can be deenergized, causing the machine to stop. Thus the point on the cycle at which the machine will stop is the same in all cycles and is determinable since the point in the cycle at which cam 83 operates switch 80 is determined, as those skilled in art are well aware, by the physical arrangement between the cam eccentricity and the main power shaft of the controlled machine. Moreover, since this arrangement is a function of the design and installation of the control circuit, the point in the cycle at which the cam switch 80 is operated is adjustable and, consequently, the point in the cycle in which the shutdown of the controlled machine will always occur is adjustable. The range of this adjustment is limited only by that portion of the cycle between the point at which cam 53 operates switch 50 and the point at which the feelers or fingers 111, 111A and 111B should contact work pieces 110, 110A and 110B, since between these two points in the cycle relay 30 must remain energized if the circuit is to function properly as above described. The advantage of being able to determine and adjust the point at which the cycle stops is that it is then possible to select that point at which the working members are furthest removed from the work pieces so that repairs or correction can easily be made.

Another advantage to be noted is the fact that once feeler 111, 111A or 111B makes contact with its respective work piece 110, 110A or 110B, the lamp associated with it lights up and stays lit until switch 50 is activated by cam 53, since the relay 40, 40A or 40B is locked in through make-before-break switch 45, 45A or 45B from the time contact between feeler and work piece is made until switch 50 opens. This is true even though one of the other feelers may not make contact with its work piece. Thus, when the machine stops because one or more feelers did not make contact with their repsective work pieces, all the lamps associated with the other feelers which have made contact with their respective work pieces remain lit, since the machine is always stopped when cam 83 operates switch 80 which is prior in the cycle to the operation of switch 50 by cam 53. The lamps associated with those feelers which have not made contact during the transfer cycle with their respective work pieces, remain unlit after the machine has stopped since, no such contact having been made, the relay 40, 40A or 40B in parallel with such lamps have never been energized and consequently, are never "locked in."

The advantages inherent in such a system are apparent. When the machine stops, the operator automatically knows that the breakdown in the transfer process has occurred at the location of the feeler or feelers associated with the unlit lamp or lamps, thereby saving the time which would otherwise have been necessary to investigate all the stations of the transfer process to determine where the breakdown occurred.

Another advantage is that whenever the machine is stopped, relay 30 is in its deenergized position and the poles of switch 20 are in the posture shown in FIGURE 1. As it thus stands, pole 28 of switch 20 is in contact with open contact 29. Therefore, when the machine is shut down there is no electrical connection between the machine and absolute ground through switch 20. The only other routes through which such a connection could exist are from ground 16 through contact 41, pole 42 and contact 43 of switch 45, through the feeler 111, to its respective work piece 110 to the machine or a like route through the respective switches and work pieces of the feelers 111A or 111B. These, however, do not exist. As already stated switch 45 is a make-before-break switch and for an instant after the energization of relay 40, pole 42 is in contact with both contact 41 and 43. The time in which this condition exists is measured in milliseconds and by the time cam 83 operates switch 80 to cause the machine to halt due to a fault in the transfer process, pole 42 is no longer in contact with contact 43. The same applies to switches 40A and 40B. Hence when the machine is stopped, it is no longer connected electrically to ground 16 of the control circuit. It is isolated from it even though one or more feelers may then be in contact with their respective work pieces.

This fact is important. If the machine were not isolated from circuit ground, the operator might receive a shock when he attempted to make corrections or repairs in the cycle, due to the fact that the machine itself is an element of a live circuit. By removing all connections between the machine and circuit ground, this danger is avoided.

As the machine operates completed work pieces are ejected or fall into bin 65. These work pieces 64 continue to build up to the point where, when bin 65 is full, electrical contact is made between feeler 62 and feeler 120 through the work pieces 64. This causes relay 60 to be energized because it then becomes part of the closed circuit from positive pole 15, through wire 54, closed switch 50, wire 56, relay 60, feeler 62, work pieces 64, feeler 120 to ground 16. With relay 60 energized, switch 90 opens. Thus, the next time cam 83 opens switch 80, relay 30 deenergizes and the machine stops. In effect, an energization of relay 60 operates to stop the machine in exactly the same manner as a failure to energize relays 40, 40A or 40B, and the resultant condition of the circuit is identical except that here the lamp indicates the full bin as being the cause of the shutdown by remaining lit rather than unlit. Thus the circuit has incorporated another control function in a simple and easy fashion without changing any of the inherent advantages of the control circuit.

Figure 4:
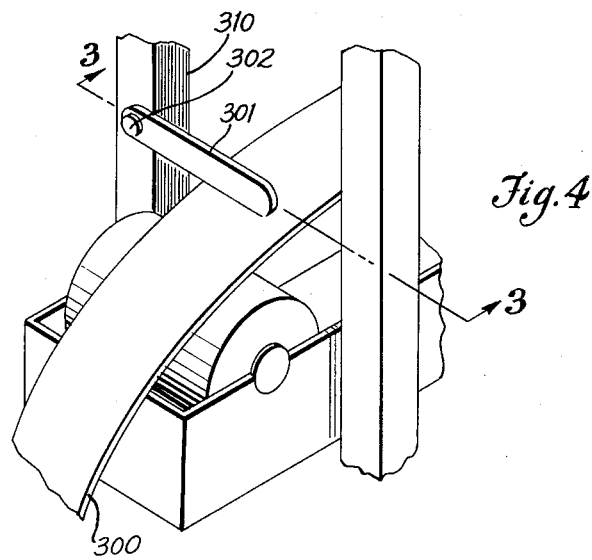
FIGURE 4 is a perspective view of the sensing device shown in section in FIGURE 3, showing a feeler being used to sense stock input to the controlled machine.
Figure 3:
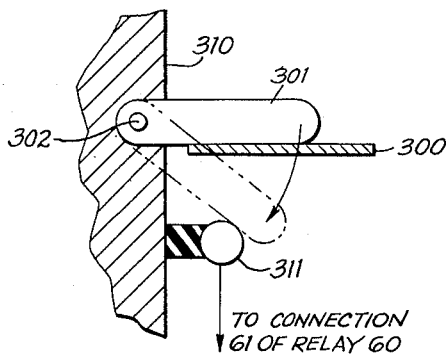
FIGURE 3 is a sectional view looking along the arrows of line 3—3 of FIGURE 4, showing structural details of a stock imput sensing device.

In like manner, an unlimited number of other control functions may easily be added to the circuit utilizing the same relay 60. For example, FIGURE 3 shows stock 300 being fed over roller into a processing unit. (A) Hinged feeler 301 is electrically connected to the controlled machine by pin 302. The feeler is supported in its horizontal position by resting on stock 300. As soon as stock 300 runs out, the offbalanced weight of hinge 301 causes it to rotate as shown in FIG. 4 and make contact with pin 311, mounted on the controlled machine but electrically insulated from it. Pin 311 is electrically connected to ground end 61 of relay 60. When feeler 301 makes contact with pin 311, relay 60 is energized since there is then a completed circuit from positive pole 15, through wire 54, through closed cam switch 50, through wire 56, through relay 60, through pin 311, through feeler 301, through pin 302, through the controlled machine, through pole 28 and contact 27 to ground pole 16. This has the same effect as a full bin, and causes the controlled machine to stop and lamp 67 to light. Thus the control circuit has now incorporated another monitored function. Obviously, other control functions can just as readily be incorporated into the control circuit.

While the preferred embodiment comprises only three transfer process feelers and one other control function, it is obvious that the number of transfer process feelers or other control functions incorporated into one control circuit can each vary from zero to any number. Thus the invention herein described can be used to monitor machines containing any number of transfer stations or having any number of other functions to be monitored or both.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A control circuit for a repetitive process machine having a plurality of stages in the process comprising power input means; switch means controlling the motion of the repetitive process, disposed to cause the operation of the repetitive process when in a first position and to halt the operation of the repetitive process when in a second position; relay means coupled to said switch means, adapted, when connected to said power input means to cause said switch means to assume said first position and, when disconnected from said power input means to cause said switch means to assume said second position; a first circuit connecting said relay means to said power input means; a plurality of second switch means connected in series in said first circuit, each adapted to open said first circuit when in an open position and to continue said first circuit through said second switch means when in a closed position; a plurality of second relay means, each coupled to one of said second switch means and adapted, when activated, to cause said second switch means to assume said closed position and, when deactivated, to cause said second switch means to assume said open position; a plurality of sensor means, each associated with one stage of the repetitive process and coupled to one of said second relay means, adapted to sense the functioning of the repetitive process through said stage and to cause said second relay means to become and remain activated when the repetitive process functions properly through said stage and to fail to cause said second relay means to be activated when the repetitive process functions improperly through said stage; a second circuit in parallel with said first circuit, adapted to connect said relay means to said power input means; third switch means coupled to said second circuit and adapted to open said second circuit once in each cycle of the repetitive process at a point in said cycle after all said second relay means have been activated because of the proper functioning of the repetitive process through said stages or have remained deactivated because of the improper functioning of the repetitive process through said stages; and fourth switch means, coupled to all said second relay means and adapted to deactivate all said second relay means once in each cycle of the repetitive process at a point in said cycle after said third switch means has opened said second circuit.

2. A control circuit for a repetitive process machine having a second monitored function comprising power input means; switch means controlling the motion of the repetitive process, disposed to cause the operation of the repetitive process when in a first position and to halt the operation of the repetitive process when in a second position; relay means coupled to said switch means, adapted, when connected to said power input means, to cause said switch means to assume said first position and, when disconnected from said power input means, to cause said switch means to assume said second position; a first circuit connecting said relay means to said power input means; second switch means in said first circuit, adapted to open first circuit when in an open position and to continue said first circuit through said second switch means when in a closed position; second relay means, coupled to said second switch means and adapted, when activated, to cause said second switch means to assume said closed position and, when deactivated, to cause said second switch means to assume said open position; first sensor means coupled to said second relay means, adapted to sense the functioning of the repetitive process and to cause said second relay means to become and remain activated when the repetitive process functions properly and to fail to cause said second relay means to be activated when the repetitive process functions improperly; third switch means connected in series with said second switch means in said first circuit, adapted to open said first circuit when in an open position and to continue said first circuit through said third switching means when in a closed position; third relay means coupled to said third switch means and adapted, when activated, to cause said third switch means to assume said open position and, when deactivated, to cause said third switch means to assume said closed position; second sensor means, coupled to said third relay means adapted to sense the functioning of the second monitored function and to cause said third relay means to fail to be activated when said second monitored function functions properly and to cause said third relay means to become and remain activated when said second monitored function functions improperly; a second circuit in parallel with said first circuit, adapted to connect said relay means to said power input means; fourth switch means, coupled to said second circuit and adapted to open said second circuit once in each cycle of the repetitive process at a point in said cycle after said second relay means have been activated because of the proper functioning of the repetitive process or have remained deactivated because of the improper functioning of the repetitive process; and fifth switch means coupled to said second and third relay means and adapted to deactivate said second and third relay means once in each cycle of the repetitive process at a point in said cycle after said fourth switch means has opened said second circuit.

3. A control circuit as in claim 1, further comprising individual indicating means coupled to each said second relay means, each said indicating means being adapted to indicate when said second relay means are deactivated.

4. A control circuit as in claim 2, further comprising first indicating means coupled to said second relay means and adapted to indicate when said second relay means are deactivated; and second indicating means coupled to said third relay means, adapted to indicate when said third relay means are activated.

5. A control circuit for a repetitive process comprising power input means; switch means controlling the motion of the repetitive process, disposed to cause the operation of the repetitive process when in a first position and to halt the operation of the repetitive process when in a second position; first relay means coupled to said switch means adapted, when connected to said power input means, to cause said switch means to assume said first position and, when disconnected from said power input means, to cause said switch means to assume said second position; a first circuit connecting said relay means to said power input means; second relay means, activated each cycle of the repetitive process when the repetitive process functions properly and remaining deactivated when the repetitive process functions improperly and adapted to close said first circuit when activated and to open said first circuit when deactivated; a second circuit in parallel with said first circuit, adapted to connect said relay means to said power input means; second switch means coupled to said second circuit and adapted to open said second circuit once in each cycle of the repetitive process at a point in said cycle after said second relay means have activated because of the proper functioning of the repetitive process or have remained deactivated because of the improper functioning of the repetitive process; and third switch means, coupled to said second relay means and adapted to deactivate said second relay means once in each cycle of the repetitive process at a point in said cycle after said second switch means has opened said second circuit.

References Cited by the Examiner
UNITED STATES PATENTS

| | | | |
|---|---|---|---|
| 2,675,507 | 4/1954 | Geiger | 307—149 |
| 2,722,274 | 11/1955 | Turnball | 317—123 |
| 2,724,087 | 11/1955 | Hand | 318—123 |
| 2,802,153 | 8/1957 | Bonn | 317—123 |
| 2,837,664 | 6/1958 | Lindstrom et al. | 307—116 |
| 2,898,483 | 8/1959 | Muller | 307—149 |
| 2,907,902 | 10/1959 | McIntosh et al. | 307—149 |
| 2,930,938 | 3/1960 | Tapper | 317—135 XR |

MILTON O. HIRSHFIELD, *Primary Examiner.*
LLOYD McCOLLUM, *Examiner.*